Dec. 8, 1936.   R. J. G. CROUCH   2,063,030
AIRCRAFT
Original Filed Dec. 31, 1931   3 Sheets-Sheet 1
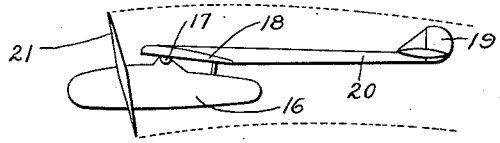
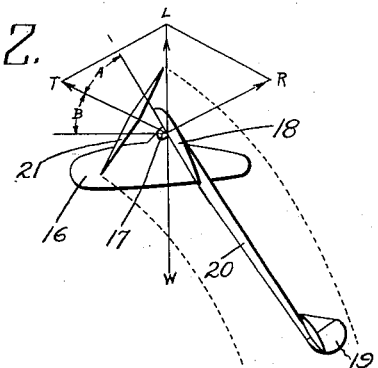
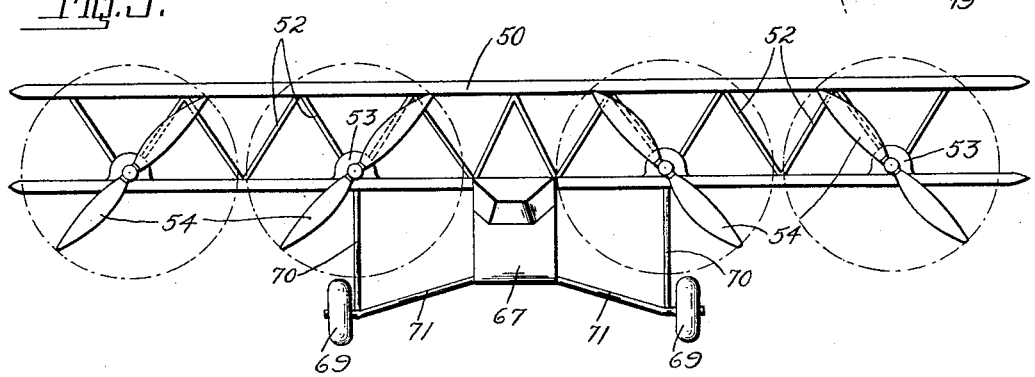
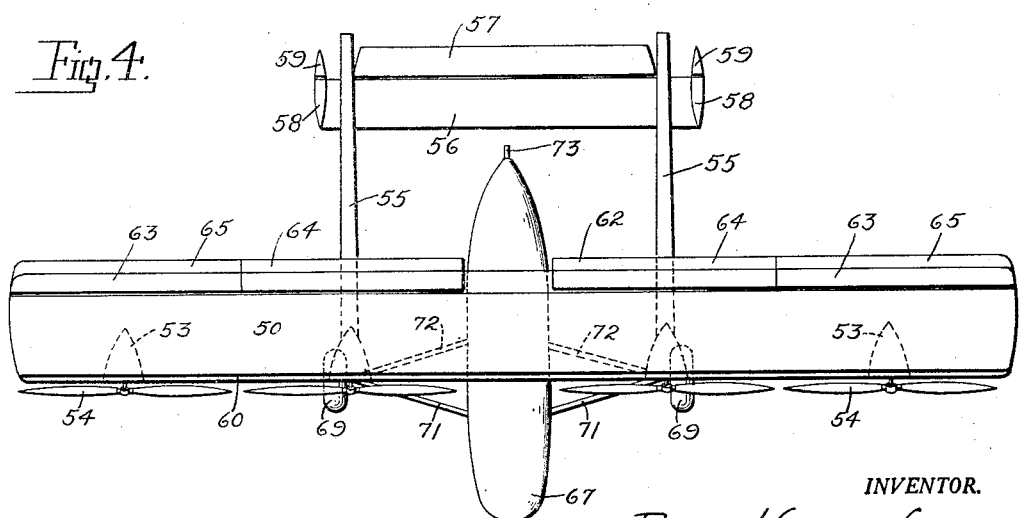
INVENTOR.
Rupert J. Goodman Crouch
BY
ATTORNEY Dec. 8, 1936.   R. J. G. CROUCH   2,063,030
AIRCRAFT
Original Filed Dec. 31, 1931   3 Sheets-Sheet 2

INVENTOR.
RUPERT J. GOODMAN CROUCH
BY
ATTORNEY

Dec. 8, 1936.     R. J. G. CROUCH     2,063,030
AIRCRAFT
Original Filed Dec. 31, 1931    3 Sheets-Sheet 3
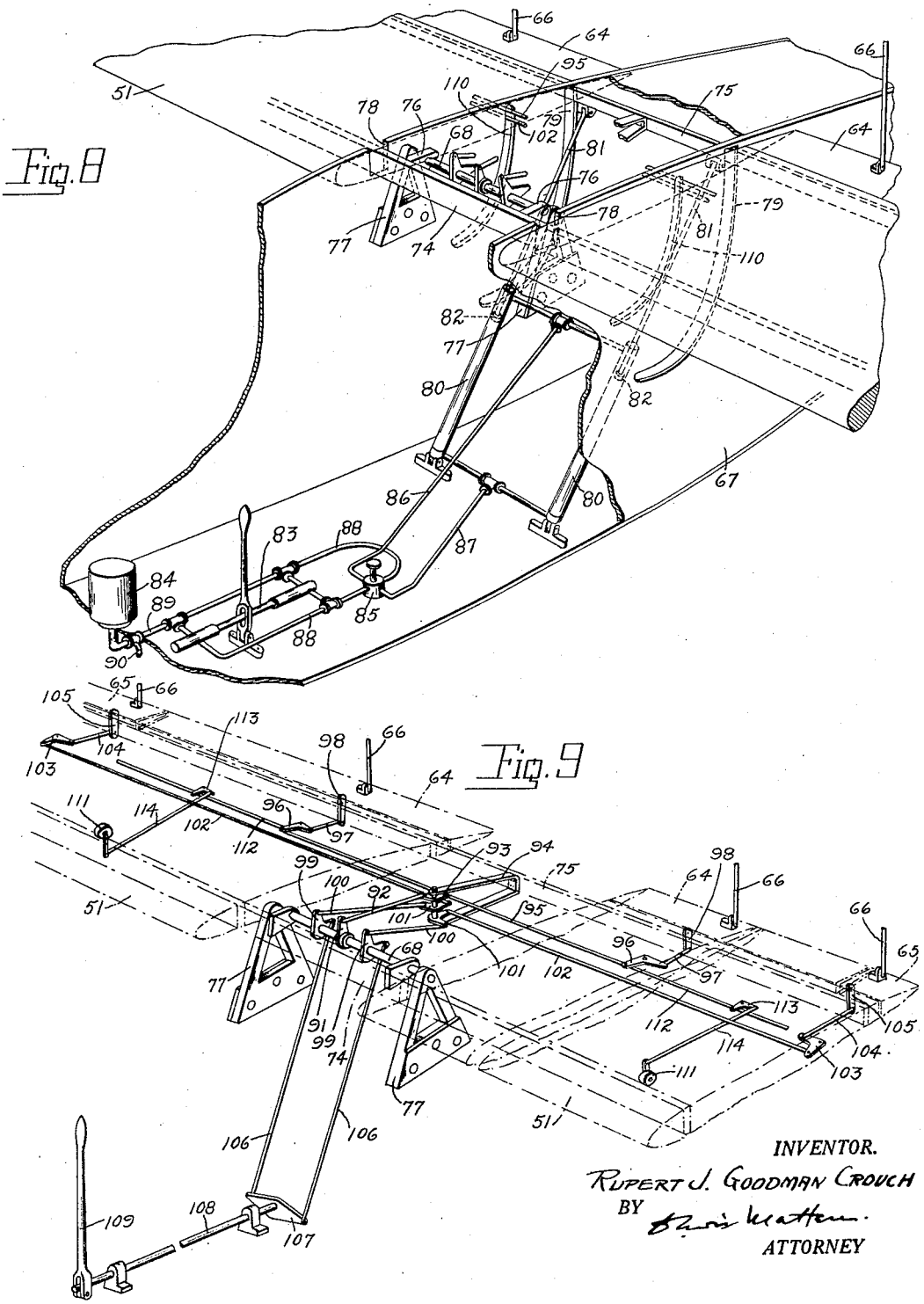
INVENTOR.
Rupert J. Goodman Crouch
BY
ATTORNEY Patented Dec. 8, 1936

2,063,030

UNITED STATES PATENT OFFICE 2,063,030

AIRCRAFT

Rupert J. Goodman Crouch, Providence, R. I.

Original application December 31, 1931, Serial No. 584,214. Divided and this application May 27, 1933, Serial No. 673,216. Renewed January 21, 1936. In Great Britain July 22, 1932

5 Claims. (Cl. 244—12)

The present invention relates to improvements in aircraft, the present application being a divisional application of original application filed in the names of Harold Bolas and Rupert J. Goodman Crouch on December 31, 1931, Serial Number 584,214. The invention has for an object to provide heavier-than-air aircraft, which is enabled to "hover", i. e., be supported at little or no forward speed relative to the ground, and which may ascend or descend substantially vertically, while at the same time retaining the normal attitude of the fuselage and the usual load carrying and top speed characteristics of aircraft heretofore in use. My improvements relate especially to the type of aircraft in which it has been proposed to reduce the stalling or lowest flying speed by causing the airscrew or propeller slip stream to act over substantially the whole of the main supporting surface to produce lift.

It has been heretofore proposed in this connection to dispose a number of airscrews along the leading edge of the wing in such manner that the slip stream acted on substantially the whole of the wing or main lifting surface. It has also been proposed to enable aircraft to hover and ascend and descend vertically by various helicopter arrangements in which the plane of rotation of the air-screws is substantially horizontal, the downward thrust directly supporting the weight of the machine. In these arrangements the slip stream is thrown entirely clear of the control surfaces if these are situated in the normal position, and hence control of the usual type cannot be resorted to.

It has been further proposed to provide airscrews having a fixed inclination to the body so as to have upward and forward components of thrust upon the wing or main lifting surfaces, the angle of which was adjustable, but in this case the fore and aft and directional control surfaces were entirely clear of the slip stream and adequate control at slow forward speeds by such means was not possible. Moreover in the high speed or low incidence condition, depending on the angular position of the wing, either the rear part of the body or fuselage would be cocked up at an attitude leading to excessive parasitic resistance, or the airscrews themselves would be inclined to the flight path at a large angle, resulting in reduction of propulsive force and excessive vibration.

It has also been proposed to provide a single central engine and propeller pivotally mounted in the nose of the body or fuselage, and controllable in flight to change the angle of the axis of rotation. In the slow speed condition the airscrew was pivoted upwards to have upward and forward components of thrust, while at the same time a small portion of the lifting surface disposed in the slip stream and pivoted relatively to the body was acted upon by the slip stream to produce extra lift. In this case also the fore and aft and directional control surfaces were clear of the slip stream and adequate control became impossible, while at the same time the extra lift derived from the movable lifting surface in the slip stream was of relatively small order.

It is proposed in the present invention to retain the fuselage in the normal substantially horizontal attitude and at the same time to dispose the control surfaces so that they are at all times in the slip stream of the air-screws and adequate control at little or no forward speed is made possible.

Among the objects of my invention are to provide aircraft in which the fuselage will be retained in the normal substantially horizontal attitude during flight, and at the same time it is proposed to reduce the minimum flying speed to a value below that obtaining in present heavier-than-air aircraft while retaining usual top speed characteristics, to reduce the stalling speed in still air to substantially zero, causing the machine to hover, while still retaining adequate control and the usual top speed characteristics, and to sustain an increased total weight per horse power in hovering, low speed, and top speed flight, so that a substantial useful load can be carried. Another object is to provide an aircraft in which the fuselage will be retained in the normal substantially horizontal attitude during flight and which can horizontally descend steeply to a landing, or ascend steeply from a confined space, while retaining the usual top speed characteristics of normal aircraft.

Other objects are to provide in an aircraft, in which the fuselage will be retained in its normal substantially horizontal attitude during flight, improved top speed characteristics while retaining the same stalling speed and load carrying capacity of normal aircraft, an increase in useful load carrying capacity while retaining the same top speed and low speed characteristics of normal aircraft, and improvements over normal aircraft in stalling speed, top speed and useful load carrying capacity.

With the above and other objects in view embodiments of my invention are shown in the accompanying drawings, and these embodiments will be hereinafter more fully described with reference thereto and the invention will be finally pointed out in the claims.

In the drawings:

Figs. 1 and 2 are diagrammatic side elevations showing two attitudes, during flight, of an aircraft of monoplane type, according to the present invention, the body or fuselage being pivotal relatively to the wing, airscrews, and control surfaces.

Fig. 3 is a front elevation of an air-craft of biplane type, embodying the invention.

Fig. 4 is a plan view thereof

Fig. 8 is a perspective view, partially broken away, of a hydraulic mechanism for varying the angle between the body or fuselage and the wings.

Fig. 9 is a perspective view, showing a mechanism for operating and controlling the wing flaps and ailerons.

Similar reference characters indicate corresponding parts throughout the several figures of the drawings.

Figure 5:
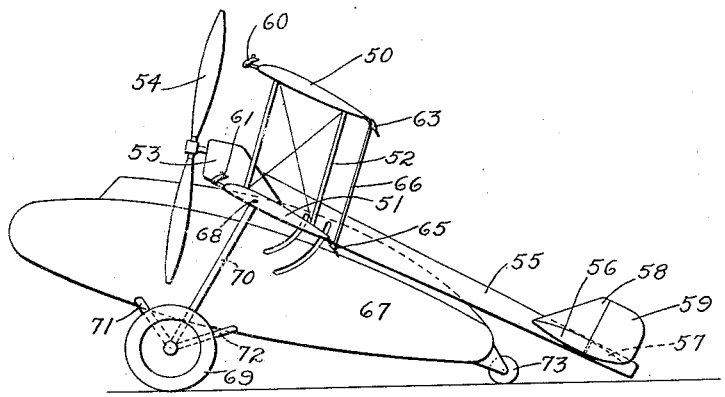
Fig. 5 is a side elevation showing the same on the ground and in the take-off position.

In Figs. 1 and 2 I have shown diagrammatically an airplane of monoplane type, in which the body or hull 16 carrying the occupants is hinged or pivotally attached, as at 17, to the wing unit 18. The tail unit 19 is supported from the wing unit by a boom structure 20 and the engine and airscrew units 21 are also carried by the wing unit, and are so arranged that their axes present a positive angle of attack in relation to the wing. The body or hull may be adjusted by suitable means, hereinafter more fully described, so that it will be substantially horizontal in the high speed condition illustrated in Fig. 1, and in the low speed or hovering condition illustrated in Fig. 2, as well as throughout the speed range of the aircraft, and the occupants will remain in a normal comfortable attitude at all times.

As hereinafter more fully described in detail the alighting gear may be attached to the body or hull and to the wing structure, or in any suitable manner.

As seen in Fig. 1 the slip stream after passing over the wing also submerges the auxiliary control surfaces, i. e., stabilizer, elevator, fin and rudder, indicated generally as 19, and hence adequate and complete control by slip stream action becomes practicable.

The attitude of the wing and auxiliary control surfaces to the horizontal, as shown in Fig. 1, would not represent a state of equilibrium at low forward speeds and when hovering, and under these conditions the machine would assume a position such as shown in Fig. 2, the body or hull being retained in its normal substantially horizontal attitude.

In this diagram OT represents the thrust of the air-screws, OR the total resultant force on the machine produced by the slip stream action, and OW the weight of the machine acting downwards. The force OL acting upwards is that due to the combination of OT and OR, and in the illustrated arrangement of my invention this is equal in magnitude to OW, thus producing a state of equilibrium. It will be observed that a proportion of the total lift is derived from the upward component of the air-screw thrust, and the remainder from the action of the air stream on the airplane proper—chiefly on the main lifting surface. Also that the forward acting component of thrust is balanced by the backward component of drag, thus resulting in no forward motion relative to still air.

It will be seen that the control surfaces lie in the path of the air flow from the wing, and hence at little or no forward speed the machine is under complete control when employing the usual auxiliary surfaces, i. e., stabilizer and elevator, fin and rudder.

If it is assumed that the angle "A" between the wing and air-screw axis is fixed, then this angle should not be excessive, since in the high speed condition, as illustrated in Fig. 1, the air-screw axis should not be unduly inclined downwardly. In the hovering condition, Fig. 2, the angle "B"—the inclination of the air-screw axis to the horizontal—is for a given aerofoil section and arrangement, dependent upon the angle "A", and should also not be excessive, its value being best determined by the greatest angle at which the engine will function satisfactorily. The combined angle "A" plus "B" represents approximately the angle of the body or fuselage to the horizon, and in general practice would be about from 50 to 60 degrees.

It has so far been assumed that the angle existing between air-screw axis and wing aerofoil is fixed and constant. If it is desired, however, to increase the lifting efficiency in the hovering attitude, and at the same time reduce the angle of the air-screw axis to the horizontal under these conditions, the power units may be arranged to be pivotally attached to their mountings, and mechanism provided of any suitable known design, which will enable the angle "A" between the air-screw axis and wing to be increased when passing from the low incidence or high speed condition to the high incidence or low speed condition.

Considering Fig. 2 it will be seen that the optimum lift obtainable from each air-screw is equal to its thrust, for if the whole of the slip stream could be dealt with by the wing and deflected downwards without loss, so as to leave the wing in a truly vertical direction, the total momentum in the stream would equal the lift, and since the total momentum in the stream is also the airscrew thrust, thrust and lift must be equal in the optimum case. In practice, however, it is not possible to avoid some lose of energy owing to interaction of wing and slip stream, and hence the whole of the air-screw thrust cannot be developed as lift.

I therefore find it highly desirable in carrying out my invention to employ an air-screw and engine design by which the static thrust per horse-power of the air-screw will be as large as possible when taking into consideration other limitations imposed by design. As is well known static thrust per horse-power depends upon diameter, revolutions per minute, pitch, blade thickness and shape, and for a given power, static thrust per horsepower is greater when the revolutions per minute are reduced and the diameter of the air-screw is increased.

I preferably employ for this purpose a low speed engine or one having a reduction gear, the latter being desirable from a weight per horse power point of view. As the thrust horse power is greater the smaller the diameter of the individual airscrew, I preferably divide the total power available into as large a number of individual units as is compatible with other aspects of the design.

As before pointed out, the pitch of the air-screw blade is a factor in static thrust per horse power, and for high specific static thrust the pitch should be relatively small, thus enabling the air-screw to work at full engine revolutions, and under efficient conditions. A small pitch, however, would be undesirable under high speed conditions, and I therefore propose to employ a variable pitch air-screw, the pitch of which can be controlled in flight, thus enabling a reasonable weight per horse power to be maintained in hovering flight, while in no way impairing efficient high speed flight. Inasmuch as variable pitch air-screws and mechanism for controlling them in flight are well known I have not shown the pitch changing means, but it will be understood that any suitable type may be employed.

The air-screw blades should preferably have thin, efficient aerofoil sections, and should be as narrow in proportion to propeller diameter as strength considerations permit. Light alloy metal blades are suitable for the purpose.

From the foregoing it will be seen that in a preferred embodiment of my invention, capable of hovering and high speed flight while carrying a substantial useful load, I propose to provide a plurality of air-screws, preferably of geared down type, and having their pitch variable in flight.

As regards the wing unit, the individual aerofoils comprising this should be arranged to present a positive angle of attack to the air-screw slip stream, and the greater this angle of attack, the smaller will be the angle of the air-screw axis to the horizon in the hovering conditions. The conditions under which the aerofoil system functions are different from those obtaining in the case of normal aircraft, in which the aerofoils are submerged in a stream of infinite depth, whereas in the present invention the aerofoils function in a limited stream, whose total depth is defined by the diameter of the air-screws. It is therefore important in carrying out my invention that the aerofoils be capable of dealing with the major portion of the stream, and of turning this through as large an angle as possible without stalling. To this end I propose, as will hereinafter be described in detail, to employ trailing edge flaps operable in flight, and under certain conditions to use slots or pilot planes, for example of the type known as Handley Page. The trailing edge flaps in the case of employment of a fixed angle of incidence between the air-screw axis and wing, will enable this angle to be retained at a value which will not involve undue downward inclination of the air-screw axes in high speed flight. In operation the flaps are pulled downwards through a considerable angle in the hovering condition, and are adjusted when flying at high speed.

In the modification illustrated in Figs. 3 to 7, and which is similar in general design to the monoplane structure shown in diagram in Figs. 1 and 2, the wing unit comprises a biplane structure consisting of upper and lower main aerofoils 50 and 51 braced together by struts 52 to form a rigid structure.

The engines 53, four in number in the illustrated embodiment, are arranged along the span or length of the lower aerofoil in such a manner that the slip stream from the air-screws 54 embraces as great a proportion of the wings as possible, and are rigidly attached to the wing in such position that the air-screw axes present a predetermined positive angle of attack to the wings. The engines are preferably of geared down type and the air-screws of variable pitch type operable in flight to change the pitch.

Tail booms 55—55 are rigidly attached to the wing structure at each side and carry at their rearward ends an empennage unit comprising a stabilizer 56, elevator 57, fins 58 and rudders 59, these being so disposed as to lie in the path of the slip stream from one or more of the air-screws. The tail booms are preferably in the form of beams designed to withstand loads submitted to the empennage or tail unit, and may be of suitable braced girder or other formation.

The aerofoils 50 and 51 are provided at their leading edges with wing-slot pilot planes 60 and 61, respectively. These are automatic in action and take the form of small aerofoils freely hinged about their centers of gravity and restrained only by stops at the two ends of the working range. In the high speed condition the pilot planes trail freely under the action of the air flow and do no more than add resistance equal to the skin friction of the pilot planes themselves. In the low speed condition they come into contact with the upper stops and then act in a similar manner to slots to delay the stalling angle at large angles of incidence.

At the trailing edges the aerofoils 50 and 51 are provided with hinged slotted flaps, which can be operated in flight, the upper aerofoil having an intermediate flap 62, and end flaps 63—63 adapted to function both as flaps and ailerons, and the lower aerofoil, having a pair of inner flaps 64—64 at each side of the body, and end flaps 65—65 adapted to function as flaps and ailerons. The flaps of the lower aerofoil, it will be observed, are arranged one behind each engine unit. Struts 66 hingedly connected between the upper and lower flaps serve to operate the two sets of flaps simultaneously. The mechanism for operating the flaps will be hereinafter described in detail, and in general is such that the flaps may be pulled down from the normal in the low speed and hovering conditions, and are interconnected to the mechanism for controlling the angular relation of the body and wing so that a single operation suffices for both controls. The body 67 is hinged to the wing unit, as at 68, in the neighborhood of the front wing spar, and can be swiveled in flight with respect to the wing unit by means of mechanism in the cabin, and which will be hereinafter described in detail.

The landing wheels 69 are situated approximately underneath the inboard engines, and transmit upward loads through struts 70 to the wing unit, these struts being hinged to the wings at points which lie on the pivoting axis 68 of the body. In addition the landing wheel axles are braced to the body by means of members 71 and 72 which serve to deal with all side loads and fore and aft loads applied to the wheels. With this arrangement the whole undercarriage can pivot with the body without offering any restraint, while at the same time downward shears and bending moments produced during landing are taken care of. This arrangement furthermore provides a relatively wide and substantial wheel track.

The tail wheel 73 is preferably of swiveling type, and is arranged at the rear of the body. Obviously this wheel may be replaced if desired by a swiveling skid.

Figure 6:
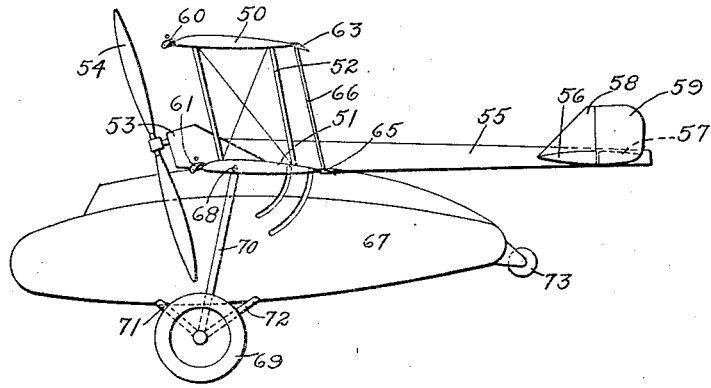
Fig. 6 is a side elevation showing the same in high speed condition.
Figure 7:
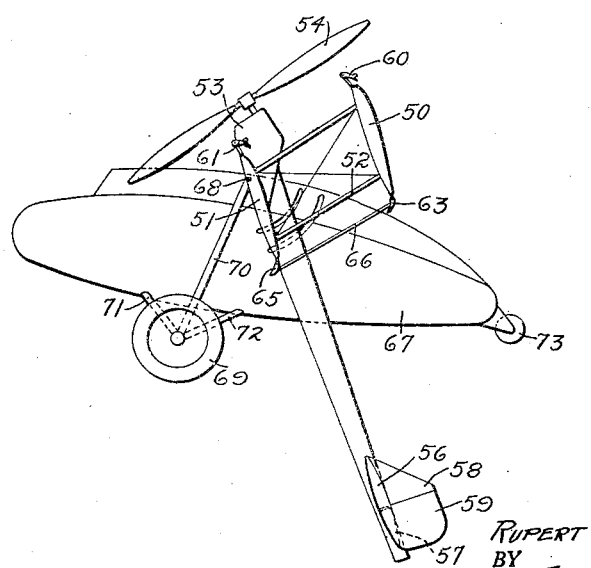
Fig. 7 is a side elevation showing the hovering or low forward speed condition.

The various positions of the body with respect to the wing unit are shown in Figs. 5, 6 and 7. In Fig. 5 the wings are inclined at a relatively large angle to the horizontal and the body is in slightly inclined position due to resting of the landing wheels and tail wheel on the ground. The air-screw axes are inclined upwards at a moderate angle. In the high speed condition, Fig. 6, the wings are inclined at a small angle of incidence to the horizontal, the body is horizontal, and the air-screw axes are inclined downwards to the horizontal. Fig. 7 shows the hovering or very slow speed condition. The wings are now inclined at a very large angle to the horizontal, the body has a moderate upward tilt, and the air-screw axes are inclined upwards to the horizontal at a much greater angle than is the case of Fig. 5. The combined angle of the air-screw axes to the wing and the air-screw axes to horizontal is such as to produce a true hovering condition. When taking off, as in Fig. 5, the aircraft is not generally in a position to acquire full lift from the combined action of air-screws and wings, and it is therefore sometimes necessary to acquire a small degree of forward speed on the ground before the full lift can be developed. After taking off the attitude of Fig. 7 can be taken up, and the forward speed checked.

In Fig. 8 I have shown a mechanism for varying the relative angle between the body and wing, this mechanism being of hydraulic type, preferably employing oil as the medium for transmitting motion.

The front and rear spars 74 and 75 of the lower wing are uncovered at the central portion and extend through the body, a pair of brackets 76—76 being secured to the front spar and pivotally journaled on the transverse pivot shaft 68, rigidly secured within the body as by end brackets 77—77. As the pivotal axis is offset from the front spar 74 openings 78—78 are formed in the sides of the body through which it moves upon swinging of the wing, while slots 79—79 are provided in the body in concentric relation to the swinging axis through which the rear spar 75 is adapted to move.

Hydraulic cylinders 80—80 are pivotally secured to the floor of the body and have sliding piston rods 81—81 and pistons 82—82 respectively operating therein, said rods being pivotally connected to the rear spar 75. In the cabin itself are provided a double-acting pump 83, an oil reservoir tank 84, and a four-way cock 85. Piping 86 and 87 extends from the cock 85 to the respective upper and lower ends of the cylinders 80, and the cock is connected to the double acting pump by piping 88, which in turn is connected to the tank 84 by piping 89, a pet cock 90 being provided in the piping 89.

In operation, oil can be drawn from the upper portions and pumped into the lower portions of the cylinders 80, depending upon the position of the four-way cock. Also the gear can be retained in any required locked position by turning the cock 85 to a neutral position. The reservoir is introduced to provide for the fact that the volume of oil above each piston is less than below it by virtue of the presence of the piston rod. When the pistons are descending in the cylinders, the surplus oil flows into the reservoir, while when the pistons are rising in the cylinders, the extra quantity required is provided from the reservoir.

In Fig. 9 I have shown a mechanism for operating the wing flaps. For the sake of clearness the showing of the body is omitted, and the lower wing is shown in dot and dash lines. A lever 91 is rigidly secured to the shaft 68, and hence to the body, and connects through a link 92 to a bell-crank lever 93 supported in a bracket 94 secured to the rear spar 75 of the wing. The bell-crank lever 93 is connected by a link 95 to bell-crank levers 96—96 located in the wings and which are connected by links 97—97 to levers 98—98 respectively secured to the inner wing flaps 64—64.

It will be seen that relative motion between the wing and body, effected through operation of the wing swing mechanism shown in Fig. 8, will operate the wing flaps 64—64, since the link 92 is connected not to the hinging axis 68, but to a point situated outside the axis. Hence the operation of changing the position of the body with respect to the wings will also effect the necessary movement of the wing flaps without involving further action by the pilot.

The outer flaps 65—65, in addition to operating during normal flight with the inner flaps 64—64, are also required to act as ailerons for lateral control. For this purpose bell-crank levers 99—99 are pivotally mounted upon the pivot shaft 68 and are connected by links 100—100 to bell-crank levers 101—101, mounted in the bracket 94, and which are connected by links 102—102 to bell-crank levers 103—103, these latter being mounted in the wings and connected by links 104—104 to levers 105—105 secured to the outer wing flaps.

The bell-cranks 99—99 are also connected by links 106—106 to the respective ends of a lever 107 provided on a torsion shaft 108, and which is adapted to be rotated by the pilot by means of the control stick 109.

It will be seen that sideways motion of the control stick operates the outer flaps as ailerons in the normal manner, while relative angular adjustment between the body and wings will move both outer flaps in the same direction in the same manner as the operation of the inner flaps.

The links 95 and 102 extend through slots 110—110 (Fig. 8) in the sides of the body arranged in concentric relation to the axis 68.

The means for varying the air-screw pitch can be of any suitable type, as for instance of the well known type in which the pitch change is effected by the operation of a two way cock acting on the oil pressure system of the engine. In the illustrated embodiment having the engines fixed to the wing this cock, shown diagrammatically at 111, Fig. 9, may be conveniently and automatically operated coincidentally with the change of angular relation between the body and wings by means of connections with the flap operating bell-cranks 96, these connections consisting of links 112, bell-cranks 113, and links 114 connecting to the two-way cocks 111.

I have illustrated and described preferred and satisfactory embodiments of my invention but it will be obvious that changes may be made therein, within the spirit and scope thereof, as defined in the appended claims.

Having thus described my invention, what I claim and desire to secure by Letters Patent is:—

1. In aircraft, a unit structure comprising a main lifting surface, variable pitch air-screw means, an engine having reduction gearing for driving said variable pitch air-screw means, said air-screw means separated from and forward of the leading edge of said lifting surface having its axis at such angle to the chord of said lifting surface that when said axis is horizontally disposed the lifting surface always presents a positive angle of incidence to the horizon, throughout the speed range, said air-screw means adapted to produce a slip stream enveloping substantially the whole of said lifting surface, means for varying the pitch of said air-screw means during flight, and means for varying the aero-dynamic characteristics of said main lifting surface during flight, and load carrying means movably supported by said unit structure.

2. In aircraft, a unit structure comprising a main lifting surface, variable pitch air-screw means, an engine having reduction gearing for driving said variable pitch air-screw means, said air-screw means separated from and forward of the leading edge of said lifting surface having its axis at such angle to the chord of said lifting surface that when said axis is horizontally disposed the lifting surface always presents a positive angle of incidence to the horizon, throughout the speed range, said air-screw means adapted to produce a slip stream enveloping substantially the whole of said lifting surface, means for varying the pitch of said air-screw means during flight, means for varying the aero-dynamic characteristics of said main lifting surface during flight and means for varying said angle of attack during flight, and load carrying means movably supported by said unit structure.

3. In aircraft, a unit structure comprising a main lifting surface having flaps and ailerons for varying its aerodynamic characteristics, and directional control surfaces, air-screw means arranged to provide a slip stream enveloping substantially the major portion of said lifting surfaces, said flaps and ailerons and said control surfaces throughout the entire speed range and in all attitudes of flight, the air screw means having its axis at such angle to the chord of the main lifting surface that when said axis is horizontally disposed said main lifting surface always presents a positive angle of incidence to the horizon, and load carrying means pivotally supported by said unit structure for relative movement between them and adapted to maintain a substantially constant attitude relative to the horizon during flight, the flaps and ailerons and all of the directional control surfaces being at all times unitary parts with said main lifting surface and air screw means and movable therewith relatively to said load carrying means, the range of movement being such that the longitudinal axis of said unit structure rearwardly of the pivot point may move past and below the horizontal axis of said load carrying means rearwardly of said pivot point.

4. In aircraft, a unit structure comprising a main lifting surface having flaps and ailerons for varying its aerodynamic characteristics, and an outrigger tail having directional control surfaces, air-screw means arranged to provide a slip stream enveloping substantially the major portion of said lifting surfaces, said flaps and ailerons and said control surfaces throughout the entire speed range and in all attitudes of flight, the air screw means having its axis at such angle to the chord of the main lifting surface that when said axis is horizontally disposed said main lifting surface always presents a positive angle of incidence to the horizon, and load carrying means pivotally supported by said unit structure for relative movement between them and adapted to maintain a substantially constant attitude relative to the horizon during flight, the flaps and ailerons and all of the directional control surfaces being at all times unitary parts with said main lifting surface and air screw means and movable therewith relatively to said load carrying means, the range of movement being such that the longitudinal axis of said unit structure rearwardly of the pivot point may move past and below the horizontal axis of said load carrying means rearwardly of said pivot point.

5. In an aircraft, in combination, a unit structure comprising a wing having lateral control surfaces forming part of said wing, and means for varying the aerodynamic characteristics of said wing in flight, a tail control surface rearwardly of said wing and attached to said unit structure, a plurality of air screws forwardly of said wing, slip stream from said airscrews impinging on both upper and lower contours of said wing, said slip stream passing successively over said wing, its variable aerodynamic characteristic means, and said tail control surface at all times, said airscrew axis and wing being disposed at a relatively large angular relationship to reduce flying speed in the low speed attitude of the machine without impairing top speed ability, and load carrying means pivotally supported by said unit structure for relative movement between them and adapted to maintain a substantially constant attitude relative to the horizon during flight, the range of movement being such that the longitudinal axis of said unit structure rearwardly of the pivot point may move past and below the horizontal axis of said load carrying means rearwardly of said pivot point.

RUPERT J. GOODMAN CROUCH.